Aug. 21, 1923.
G. B. PICKOP
1,465,558
FRUIT PRESS
Filed July 3, 1920
2 Sheets-Sheet 1
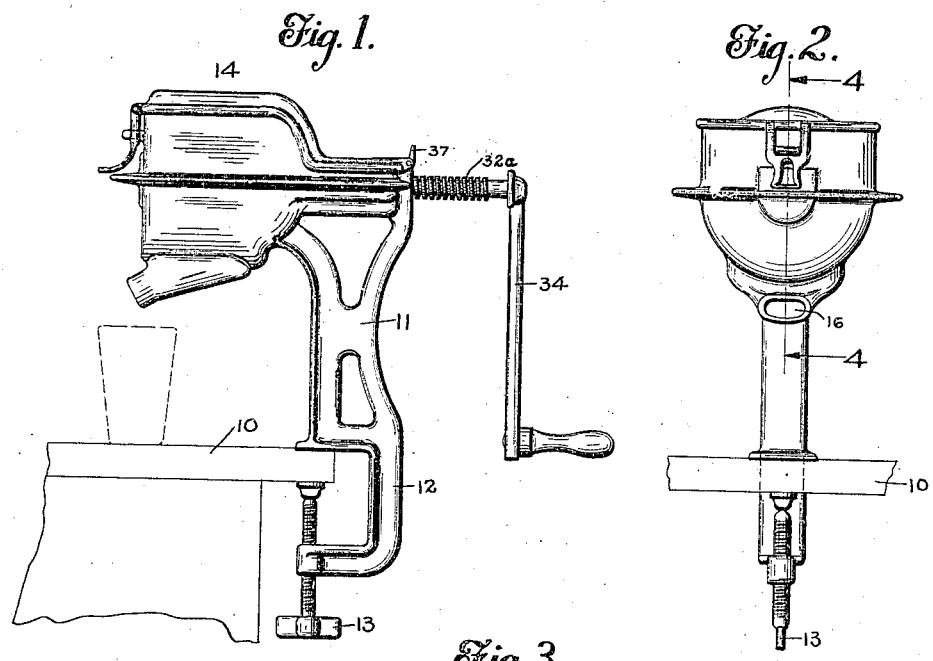
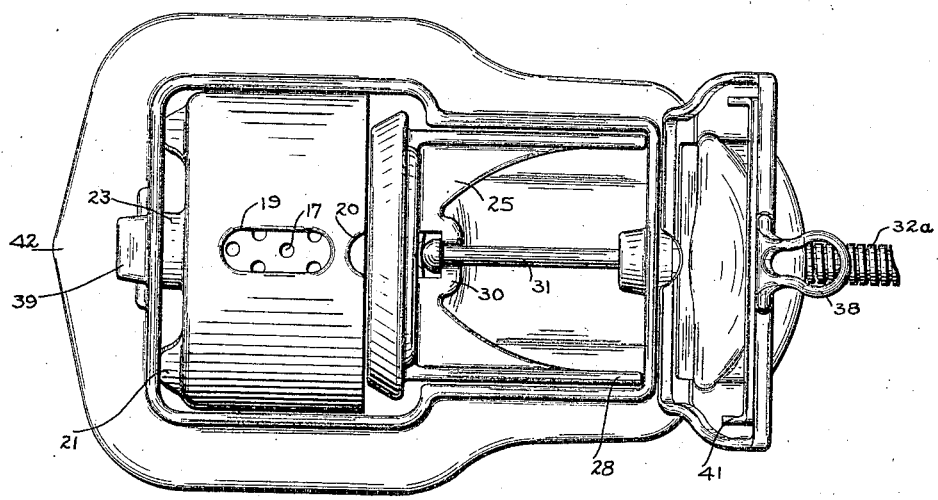
Inventor
George B. Pickop
By Henry E. Rockwell
Attorney

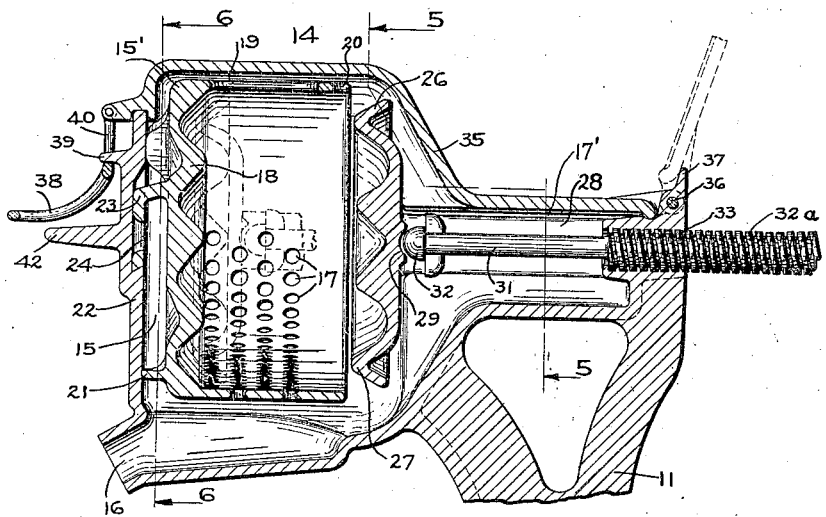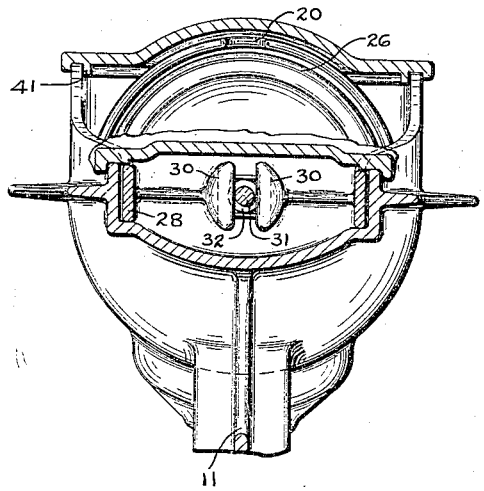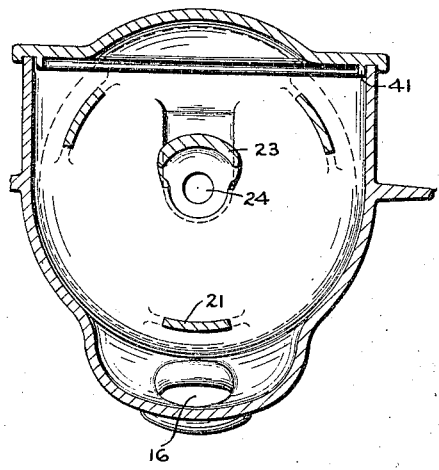

Patented Aug. 21, 1923.

1,465,558

UNITED STATES PATENT OFFICE.

GEORGE B. PICKOP, OF NEW HAVEN, CONNECTICUT, ASSIGNOR TO MALLEABLE IRON FITTINGS COMPANY, OF BRANDFORD, CONNECTICUT.

FRUIT PRESS.

Application filed July 3, 1920. Serial No. 393,887.

*To all whom it may concern:*

Be it known that I, GEORGE B. PICKOP, a citizen of the United States, residing in the city and county of New Haven, State of Connecticut, have invented certain new and useful Improvements in Fruit Presses, of which the following is a full, clear, and exact description.

This invention relates to presses, and particularly to that type of the same which is used to extract the juice of fruits, vegetables, or the like. It has been the custom in devices heretofore known and used to provide a press of this type with a vertically acting plunger and a lever of one type or another to operate this plunger.

One object of my invention is to provide a fruit press of this type with a horizontally acting plunger.

Another object of the invention is to provide a fruit press having a detachable and removable material receptacle.

A further object of this invention is to provide a fruit press of this type with an improved plunger, and means for guiding the same in its movement.

A still further object of the invention is to provide acting or pressing surfaces of an improved type so that practically all of the juice may be extracted from the mass in the receptacle, and to so generally improve the structure of the press that it may be readily and conveniently operated, and also taken apart for the purpose of cleaning, and just as readily put togther again.

In the accompanying drawings:

Fig. 1 is a side elevational view of my improved fruit press.

Fig. 2 is a front view of the same.

Fig. 3 is a plan view showing the lid or cover of the device in raised position.

Fig. 4 is a sectional view taken on line 4—4 of Fig. 2.

Fig. 5 is a sectional view on line 5—5 of Fig. 4.

Fig. 6 is a sectional view on line 6—6 of Fig. 4, looking in the direction of the arrows.

In the embodiment of my invention, which I have particularly chosen to illustrate in the accompanying drawings, I have shown at 10, a supporting table or bench of a suitable type, having the standard 11 of my improved press attached thereto by a clamping yoke 12 and a clamping screw 13. The clamping yoke is shown as integral with the standard 11, and may be of any suitable form. The body 14 of my fruit press is shown as provided, with a relatively large forward chamber 15, having a drip or discharge spout 16, and a rear guide portion 17' which communicates with the chamber 15. In the chamber 15 is shown the removable material receptacle 15' which is provided on the lower half of the cylindrical surface thereof with perforations 17, and in the bottom thereof it is provided at its side facing the interior of the receptacle, with corrugations 18. At the top of the cylindrical portion of the receptacle 15' is provided a finger hole 19, and a recess 20 by which the cylinder may be grasped by the finger and thumb and readily removed from the chamber. The front or the bottom of the receptacle is provided with a plurality of spacing lugs 21, three as shown in the drawings, which are adapted to space the bottom of the receptacle from the rear wall 22 of the chamber, also, the bottom of the receptacle is provided with a lip 23, which is adapted to enter a groove or a recess 24 in the rear wall 22 of the chamber.

The plunger 25 consists of a removable head 26, which is provided at its front face with corrugations 27, which cooperate with the corrugations on the bottom of the receptacle, and rear guide portions 28 which extend rearwardly into the guide portions 17' of the chamber, and are suitably held and guided therein in their movement back and forth by means to be hereinafter described. The head 26 of the plunger is provided at its rear face with a socket or recess 29 and with two spaced and oppositely disposed lugs 30, between which extends one end of a plunger rod 31. This rod 31 is provided on its end, just within the two lugs 30, with an enlargement 32 which is so shaped as to be received in the socket or recess 29. It will be apparent that in this way, the plunger is detachably connected to the plunger rod so that it may be grasped by the fingers and freely lifted out of the chamber when the lid is raised. On the other hand, when it is replaced in its operative position it is securely held to the plunger rod 31 so that it may be pushed forward by this rod in its operative movement, or retracted by this rod to enable the parts to be removed, or another charge of fruit or the like, put in the receptacle. The plunger rod 31 is enlarged at its rear end, and provided with a threaded portion 32ᵃ which is received in a threaded bore 33 in the rear side of the standard 11. This end of the plunger rod projects through the standard 11 and is provided with a suitable crank or handle 34, which is secured to the plunger rod, and by which the rod may be turned to thrust the plunger into the receptacle, or to withdraw it therefrom.

The body 14 is provided as a whole with a hinged lid 35, which, when raised, exposes or gives access to both the forward chamber portion and the rear guide portion of the body. This lid is hinged to the upper rear portion of the standard 11 by pivot pin 36, and there is provided on the standard, adjacent this pin, a lug 37, which conveniently supports the cover in raised position as shown in dotted lines in Fig. 4. The forward portion of the cover is provided with a hasp 38, the opening 40 of which fits over a lug 39 provided on the outside of the rear wall of the chamber. The front portion of the cover is provided interiorly with a rib 41, which extends practically all around that portion of the cover which is above the chamber and insures a close fit of the cover thereon. The hasp is so arranged in cooperation with the lug 39 that this hasp must be sprung tightly over the lug, and thus hold the cover firmly in position on the chamber. The body is also provided with a strengthening rib 42 which extends entirely around the same at about the central portion thereof, between the upper and lower edges, and serves to assist the chamber in withstanding the strains to which it is exposed. It will be apparent that by the provision of the threaded plunger rod and crank, considerable force may be exerted on the plunger, and that therefore, the chamber must possess sufficient strength to withstand the strain incident to the application of this force.

It will be apparent that with my device a number of receptacles 15' may be used with one press. These may be filled with different kinds of fruit from which it is desired to extract the juice, and one after another be placed in the chamber and the juice extracted. In the use of my device, it is therefore, unnecessary to clean the receptacle each time it is desired to use the press with a different kind of fruit or material from which the juice is to be extracted, as the receptacle may be readily removed and new ones inserted which contain the various kinds of material.

The opening 19, in addition to providing a convenient means by which the cylinder may be lifted from the chamber, also provides an opening through which the finger or an instrument such as a fork or the like may be thrust to clean the pulp or waste material from the receptacle, the cleaning of which can thus be accomplished with greater facility than if the pulp which is pressed firmly against the bottom of the receptacle must be attacked through the open end at the top of the same.

The provision of corrugations on the bottom of the plunger and receptacle, virtually increases the effective acting surfaces of these two elements. The material in the receptacle will be spread out over the undulating area of these surfaces, which area will, of course, be greater than the area of a plane surface having the same diameter. Thus the pulp may be pressed out into a thinner mass than is otherwise possible and consequently a much larger percentage of the juice extracted from the same.

As shown in Fig. 4, when the lid 35 is closed the members 28 are guided in their movement between the lid and the bottom of the guide portion 17' of the chamber. In this manner, convenient guideways for the plunger are provided which interfere in no way with the ready removal of the same from the chamber when desired. These guide members 28 and the guideways in the body portion of the press are particularly desirable on account of the loose, detachable, connections between the plunger and the plunger rod 31.

While I have shown and described one preferred embodiment of my invention, it is to be understood that I do not wish to be limited to the exact form, as many structural variations and modifications are possible, which lie within the spirit of the invention and the scope of the appended claims.

What I claim is:

1. In a fruit press or the like, a standard, a chamber supported thereby, a material receptacle removably mounted in the chamber, a plunger mounted in the chamber to move in and out of said receptacle and arranged to be operated in a horizontal direction.

2. A fruit press comprising a standard, a normally closed chamber mounted on said standard, a material receptacle removably supported in said chamber, and a horizontally reciprocable plunger operating in said receptacle and guided in its movement by the chamber walls.

3. A fruit press or the like comprising a horizontally disposed chamber having an opening at the top, a lid for closing said opening, a perforated receptacle suspended in said chamber and removable through said opening.

4. A fruit press or the like having a material receptacle, a plunger cooperating therewith, and a plunger rod connected to said plunger for movement in a substantially horizontal plane, said plunger being freely liftable to disconnect the same from said plunger rod, and being guided in its horizontal movement independently of the rod.

5. In a fruit press or the like, a standard, a horizontally disposed chamber carried thereby having a top opening and a cover for said opening, a receptacle mounted in said chamber against one end thereof, a plunger and plunger rod in the chamber, said rod being mounted in the opposite end thereof, and a strengthening rib surrounding the chamber and adapted to bind said ends together.

6. In a fruit press, a plunger rod, a plunger loosely connected therewith, and removable therefrom by movement in a direction transverse to said rod, said plunger having a guide portion, and a guideway with which said guide portion cooperates to maintain the plunger in a plane transverse to the rod.

7. In a fruit press or the like, a chamber, a plunger operating therein having rearwardly directed guide elements, said chamber being provided with a guideway cooperating with said elements.

8. A fruit press including a chamber body provided with a chamber portion and a guide portion communicating with each other, and a plunger operating in said chamber and guided by said guide portion.

9. In a horizontal fruit press, a chamber, a cover therefor, a plunger operating in said chamber, said plunger being guided by the bottom of a portion of the chamber and said cover.

10. A horizontal fruit press or the like comprising a chamber, a cover therefor, the bottom of said chamber cooperating with said cover, at one end thereof to form a guideway when the cover is closed, a plunger mounted in the chamber and a guide member on the plunger operating in the guideway.

11. A horizontal fruit press or the like, comprising a chamber, a cover therefor, a plunger having guide flanges operating therein, said cover and the bottom of a portion of said chamber forming a guideway in which said flanges operate.

12. In a device of the character described, a chamber, a receptacle contained therein, one wall of said chamber being provided with a recess, and a lip on one side of the receptacle fitting into said recess.

13. In a fruit press, a horizontally disposed chamber and a receptacle suspended therein, the body of said receptacle being out of contact with the walls of the chamber.

14. In a fruit press, a horizontally disposed chamber and a receptacle suspended from one of the end walls thereof.

15. In a device of the character described, a horizontally disposed chamber and a receptacle removably suspended from the end wall of the chamber.

16. In a fruit press, a horizontally disposed normally closed chamber and a material receptacle mounted in said chamber and suspended above the bottom thereof, and means to permit the expressed juice to flow from the chamber.

In witness whereof, I have hereunto set my hand on the 30th day of June, 1920.

GEORGE B. PICKOP.

Witnesses:
K. O'BRIEN,
A. FITZGERALD.